Oct. 8, 1968
M. NEDELEC
3,404,973
GLASS SHEET FORMING APPARATUS WITH COATED SILICA
CORE ROLLER AND ROLLER
Filed March 5, 1964
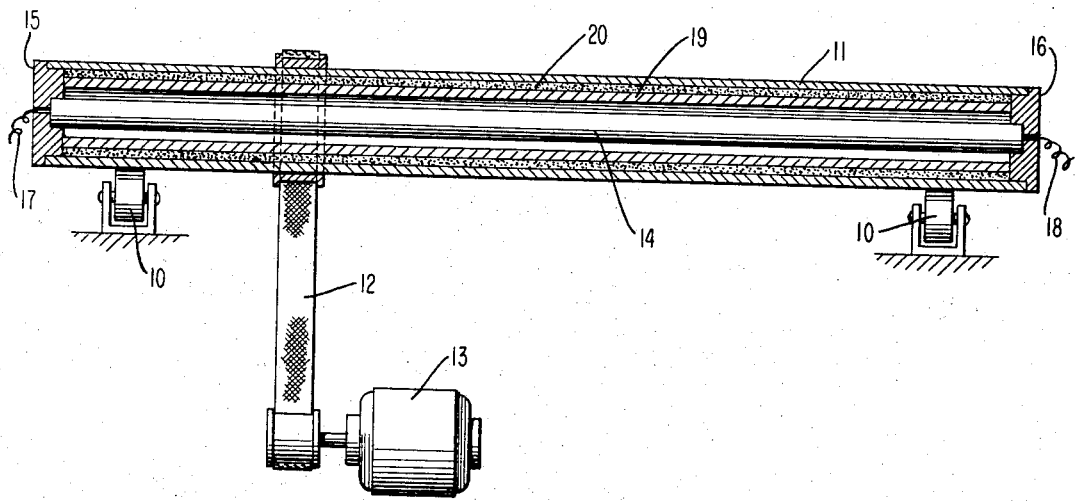
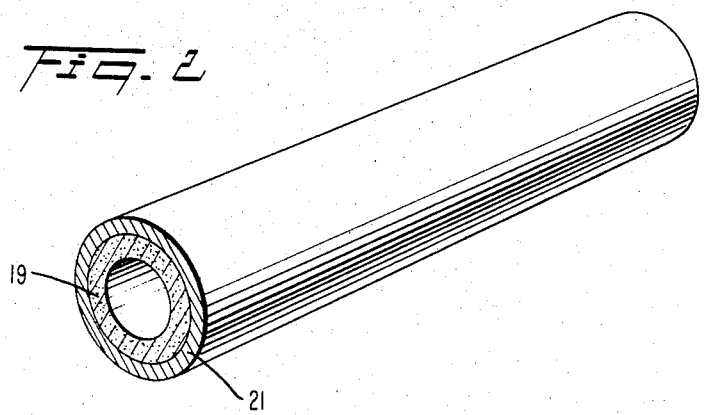
INVENTOR.
MAURICE NEDELEC
BY Bauer and Seymour
ATTORNEYS

United States Patent Office 3,404,973
Patented Oct. 8, 1968

3,404,973
GLASS SHEET FORMING APPARATUS WITH COATED SILICA CORE ROLLER AND ROLLER
Maurice Nedelec, Paris, France, assignor to Compagnie de Saint-Gobain, Neuilly-sur-Seine, France
Filed Mar. 5, 1964, Ser. No. 349,652
Claims priority, application France, Mar. 5, 1963, 926,937
12 Claims. (Cl. 65—253)

This invention relates to the problem of supporting hot flat glass without damaging its surface. This problem arises in the manufacture of sheet glass, in which the glass issues from forming means in a plastic state above the deformation point, being transported on rollers during cooling, and in the tempering of glass plates when the glass is transported horizontally at about its softening point, a method which is particularly useful in handling large plates such as doors and display windows. Tempering is illustrative.

In making tempered glass the usual method involves vertical transportation, the plate being grasped at its upper edge, by pincers, at its softening temperature or thereabouts. That suspension method has advantages, and also the disadvantages that the pincers mark the plate, the weight of the plate deforms the area around the grips, and the whole plate may become elongated with an accompanying change of dimensions. Such difficulties have led to attempts to transport the glass flat, horizontally, but this has required the use of carrying rollers which introduce difficulties of their own.

Such rollers have been apt to deform at the temperatures imparted by the hot glass, and when deformed they mark the glass. The glass may adhere to the roller, introducing a defect at the place of adherence and at each turn of the roller. By cooling the rollers those difficulties are lessened but at the price of reduced thermal efficiency and increased cost of the product. It has been proposed to remedy such faults by making the rollers of silica but such rollers begin to mark the plates after they have been in use. The reason for this has not, so far as I am aware, been understood.

I have investigated the operation of such silica rollers and have discovered that they contain microbubbles and that tiny particles of the silica enclosing the bubbles become loosened or even detached, in the first state marking the glass and in the second adhering to it. When the removal or particles exposes cavities the shape of the cavities is marked on the glass.

It is an object of the invention to improve the apparatus for transporting glass sheets in a hot state. Another object is to improve the transportation of glass, and other plastic materials, in sheet form at a temperature at which their surfaces are readily marked.

The objects of the invention are accomplished by a novel roller which has a core of silica and an external cylindrical sleeve with a perfectly smooth surface composed of refractory oxide or silicate, silica itself being a suitable refractory oxide coating material, as subsequently explained.

In the drawing:

FIG. 1 is a vertical section through an apparatus for making silica rollers, and FIG. 2 is a perspective view of an end of the novel roller.

In FIG. 1 bearings 10 support a rotary steel tube 11 which is rotated by a belt 12 from a motor 13. An electrode 14 is carried axially in the tube by plugs 15, 16 removably fitting the ends of tube 11 and through which leads 17, 18 extend to deliver current to the electrode. The tube, before being closed by emplacement of the plugs, receives a charge of silica and which is evenly distributed against the wall of tube 11, by rotation thereof by motor 13, and melts from the inside out as electrode 14 is heated to high temperature by the current passing therethrough, forming a silica tube 19 within a layer of sand 20. After tube 19 has been formed to a desired thickness plugs 15, 16 are removed and silicon tube 19 is moved axially out of tube 11 and given a smooth surface by a method which is well known in this art and which we will refer to only as the standard surfacing method.

The silica tube obtained by this method is then roughly dressed, for example by using a corindon or diamond grinding-wheel to obtain a cylindrical-shaped tube of a diameter slightly less than the diameter required for the finished tube. The surface of said tube presents microbubbles which have been opened during the dressing operation. A rough surface suitable for the coating operation is then usually obtained. However the tube can be advantageously sand blasted previously to the coating operation to ensure a proper adherence of the coating over the surface of the tube. The rectified, and eventually sandblasted tube is then coated by a coating of a refractory oxide or silicate, such as silica zirconium oxide, alumina and zirconium silicate. These refractories may be applied alone or in combinations. This coating is obtained by blowing onto the surface of the tube molten particles of the oxide or silicate, carried by a current of gases at a high temperature, for example of 1500 to 2000° C., such as can be obtained by using an oxiacetylinic torch or a plasma-torch.

The thickness of the layer of oxide or silicate obtained by this method is of about 0.6 mm. before rectification and of 0.4 mm. after rectification. Said layer is perfectly free of microbubbles or other imperfections.

The coated tube is then finally dressed to its exact dimensions by using, for example, a grinding-wheel.

The novel rollers with dressed revetments do not have the faults of prior art rollers: they are free from surface defects, do not release particles which adhere to the glass or other plastic, do not develop pits, and are not deformed. It is especially surprising that a roller of silica coated with silica should be superior to a roller formed as an integral one-piece body of silica.

What is claimed is:

1. A roller, adapted to support objects in a plastic state, in particular, hot sheet glass, consisting essentially of a core of silica bearing a microbubble free coat of silica having a continuous, smooth surface adherent to said core.

2. A roller, adapted to support objects in a plastic state, in particular hot sheet glass, consisting essentially of a core of silica bearing a microbubble free coat of zirconium oxide adherent to said core.

3. A roller, adapted to support objects in a plastic state, in particular hot sheet glass, consisting essentially of a core of silica bearing a microbubble free coat of alumina adherent to said core.

4. A roller, adapted to support objects in a plastic state, in particular hot sheet glass, consisting essentially of a core of silica bearing a microbubble free coat of refractory metal silicate adherent to said core.

5. A roller, adapted to support objects in a plastic state, in particular hot sheet glass, consisting essentially of a core of silica bearing a microbubble free coat of refractory metal oxide adherent to said core.

6. In apparatus for the treatment of hot sheet glass, supporting means for the sheet comprising as the essential, glass-contacting means, rollers having a core of silica and a continuous, smooth microbubble free coat of silica adherent to said core.

7. In apparatus for the treatment of hot sheet glass, supporting means for the sheet comprising as the essential, glass-contacting means, rollers having a core of silica and a continuous, smooth microbubble free coat of zirconium oxide adherent to said core.

8. In apparatus for the treatment of hot sheet glass, supporting means for the sheet comprising as the essential, glass-contacting means, rollers having a core of silica and a continuous, smooth microbubble free coat of alumina adherent to said core.

9. In apparatus for the treatment of hot sheet glass, supporting means for the sheet comprising as the essential, glass-contacting means, rollers having a core of silica and a continuous, smooth microbubble free coat of refractory metal silicate adherent to said core.

10. In apparatus for the treatment of hot sheet glass, supporting means for the sheet comprising as the essential, glass-contacting means, rollers having a core of silica and a continuous, smooth microbubble free coat of refractory metal oxide adherent to said core.

11. In apparatus for the treatment of hot sheet glass, supporting means for the sheet comprising as the essential, glass-contacting means, rollers having a core of silica and a continuous, smooth microbubble free coat of zirconium silicate adherent to said core.

12. A roller for the support and transport of hot sheet glass, comprising, a core of fused silica, and a continuous, smooth, microbubble-free refractory coating adherently secured to and about said core, said coating consisting of material selected from the group alumina, zirconia, zirconium silicate, and silica.

References Cited

UNITED STATES PATENTS

| | | | |
|---|---|---|---|
| 1,273,310 | 7/1918 | Baker | 65—374 |
| 1,439,410 | 6/1921 | Gray | 65—374 |
| 2,919,209 | 12/1959 | Bossard | 65—374 |
| 3,141,756 | 7/1964 | Giffen | 65—374 |
| 3,239,368 | 3/1966 | Goodman | 117—93.1 |
| 2,300,528 | 11/1942 | Sherts | 65—253 |

DONALL H. SYLVESTER, *Primary Examiner.*

R. L. LINDSAY, *Assistant Examiner.*